United States Patent [19]
Yao et al.

[11] Patent Number: 6,021,666
[45] Date of Patent: Feb. 8, 2000

[54] DETERMINING A CLOSE POINT FOR GLIDE HEADS

[75] Inventors: Wei Hsin Yao; Chiao-Ping (Roger) Ku, both of Fremont; Franc Orangel Leon-Mendez, San Jose, all of Calif.

[73] Assignee: Seagate Technology, Inc., Scotts Valley, Calif.

[21] Appl. No.: 09/145,125

[22] Filed: Sep. 1, 1998

Related U.S. Application Data

[60] Provisional application No. 60/078,559, Mar. 19, 1998.
[51] Int. Cl.$^7$ ..................................................... G11B 21/00
[52] U.S. Cl. .............................................................. 73/105
[58] Field of Search ............................... 73/105; 324/210, 324/226; 360/103

[56] References Cited

U.S. PATENT DOCUMENTS

| | | | |
|---|---|---|---|
| 5,267,109 | 11/1993 | Chapin et al. | 360/103 |
| 5,721,650 | 2/1998 | Crane et al. | 360/103 |
| 5,774,304 | 6/1998 | Crane et al. | 360/103 |

*Primary Examiner*—Daniel S. Larkin
*Attorney, Agent, or Firm*—Merchant & Gould P.C.

[57] ABSTRACT

A method of determining the close point for a glide head includes measuring the fly height of at least three positions remove from the selected close point position. The three selected positions are curve-fitted and extrapolated so as to obtain the height at the selected close point. Adaptions are made where the glide head can roll and measurements can be taken at locations transversely across the head.

12 Claims, 5 Drawing Sheets

DETERMINING A CLOSE POINT FOR GLIDE HEADS

This application claims the benefit of U.S. Provisional application No. 60/078,559 filed Mar. 19, 1998.

BACKGROUND OF THE INVENTION

This invention relates to determining a close point of a glide head, which is used in disk drive technology.

High performance magnetic rigid discs usually require a dedicated landing zone to optimize tribological performance while supporting low glide height. Laser texturing techniques have been introduced to create such a landing zone. The pattern of laser texture bumps often consists of a constant pitch in both circumferential and radial directions. However, during take-off and landing the head often experiences a quite different interface dynamic compared to a traditional mechanical texture.

A glide test is a process that computer hard disc drive manufacturers use to control and assure the quality of media. The glide head often consists of a piezoelectric transducer ($PbZr_{1-x}Ti_xO_3$ PZT) mounted on an air bearing slider, but the size, shape, and mounting location of the PZT may vary. During the glide test process, the glide head flies over a disc surface at a predetermined clearance from the disc surface, also known as glide height. If contact occurs between the glide head and a disc asperity or a defect, the glide head is forced to vibrate and deform. The slider deformation results in the PZT deformation, and a potential difference is generated between the electrodes of the PZT. When the contact occurs, many vibration modes of the PZT and slider are excited simultaneously, and each mode generates a voltage at its specific frequency. Signal generated from the PZT are fed to a pre-amp and a band pass filter. A digital data acquisition system on the glide tester then processes the filtered data to compute the RMS value. The RMS signals can be used to calculate the glide avalanche breaking point (GABP) as well as to determine whether the disc passes or fails glide test. If the magnitude of the RMS voltage exceeds a predetermined threshold level, the disc is rejected.

During glide avalanche measurement at the LZT, periodic laser bump excitation and its high order harmonics may excite the natural frequency of the glide head. It can cause enormous signal read out which would mislead the reading of GABP.

With the increase of disc drive storage areal density, the fly height of a slider decreases substantially. The requirement for high quality rigid disc media without defects or asperities becomes very stringent. To meet this challenge, the design of glide heads needs to satisfy the following objectives:

1) The head fly height is sensitive to linear velocity.
2) The head is able to maintain a stable flying height down to $0.5\mu$ inch.

Objective (1) is typically achieved by deploying the catamaran air bearing design. Objective (2) is achieved by reducing the width of the air-bearing surface. However, to measure such a low fly height poses another challenge. In general, a fly height tester cannot measure the slider fly height at the edge. Consequently, one would measure the fly height at the 1 mil point, that is one mil from the edge. However, the fly height at the 1 mil point is higher than the one at the close point (Cp). The difference between the 1 mil point and close point depends on the head crown, head pitch, and roll.

A system is needed to improve the reliability of measuring the close point for a glide head.

SUMMARY OF THE INVENTION

By this invention there is provided a system for determining a close point for a glide head which overcomes the problems of the prior art.

The invention is directed to a method to calculate the fly height of the close point.

According to the invention, the method of determining the fly height of a selected point, preferably the close point of a glide head comprises measuring the fly height of at least three positions removed from the selected point. Curve fitting is applied to the at least three selected points, and the curve is extrapolated to thereby obtain the height at the selected point, preferably the close point.

Measurements of five or more points can be effected to obtain improved data of the close point.

Also, according to the invention, measurements can be effected transversely across the edge of the head at predetermined locations across the head. The appropriate close point can then be chosen.

The close point methodology allows precise height detection in the glide test. In addition, it will minimize the nominal fly-height variation due to the head pitch and roll.

The invention is now further described with reference to the accompanying descriptions and drawings.

DETAILED DESCRIPTION OF THE INVENTION

Figure 1A:
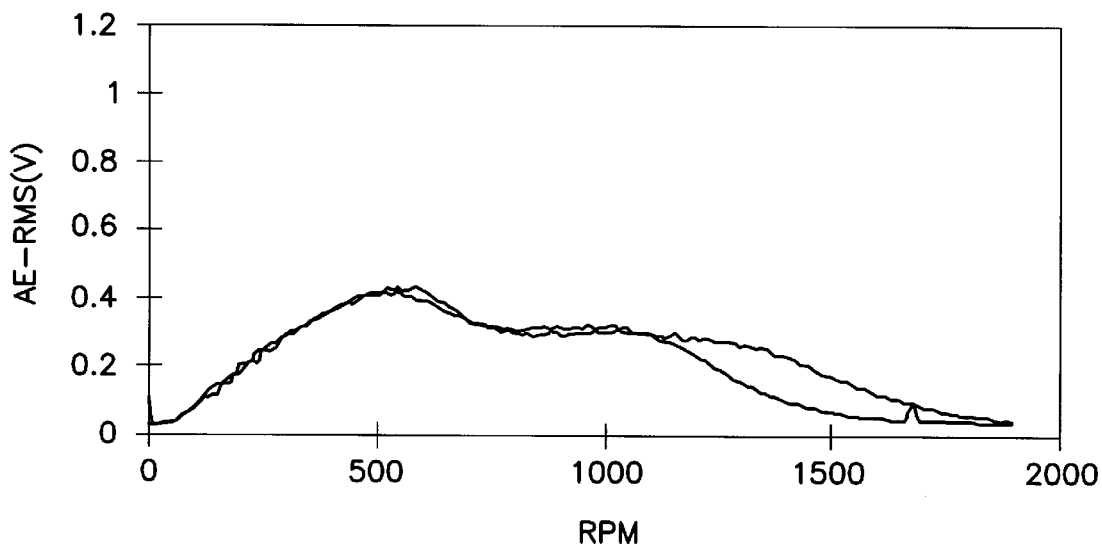
FIGS. 1a and 1b are RMS AE signals of a read write head taking-off from (a) a mechanical texture disc (FIG. 1a) and (b) a laser zone texture disc (FIG. 1b). The BH=220A and the bump pitch 30 $\mu$m×30 $\mu$m.
Figure 1B:
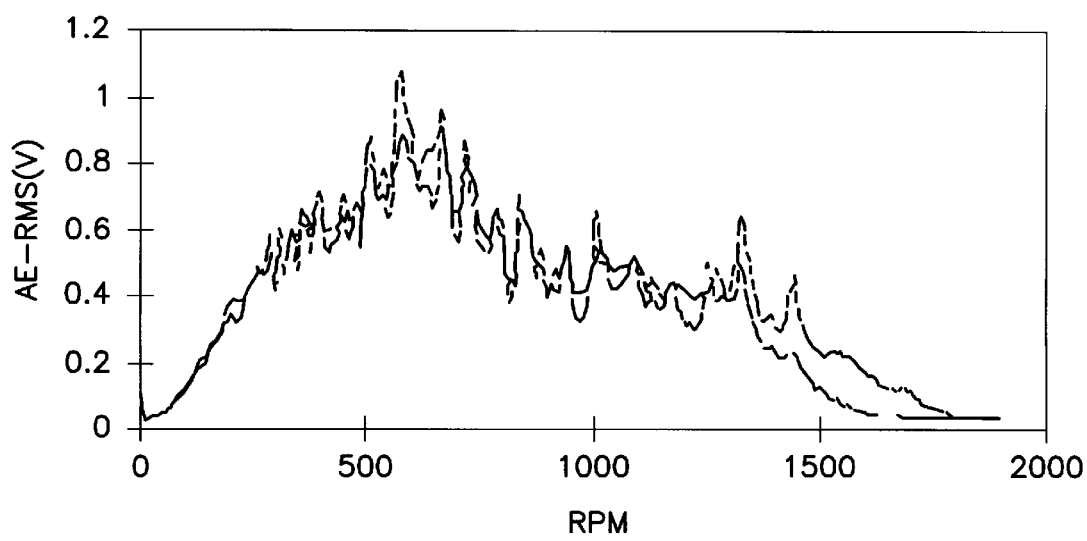

FIG. 1a and FIG. 1b presents RMS signals of an acoustic emission (AE) sensor, which is mounted near the base plate of the suspension, of a read-write head taking-off from a mechanical texture and a laser zone texture (LZT) discs respectively. The LZT disc shows reproducible oscillations in FIG. 1b which appear to be some vibration generated in the head disc interface due to the periodical pattern of laser texture bumps.

Figure 2:
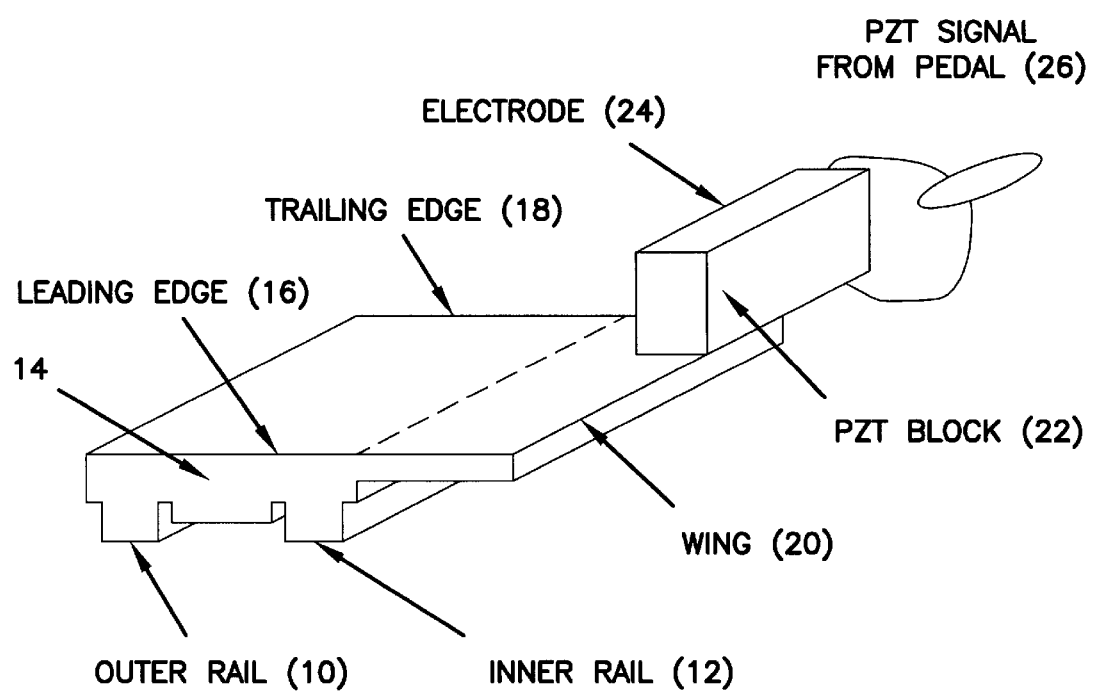
FIG. 2 is a perspective view of a PZT glide head.
Figure 4:
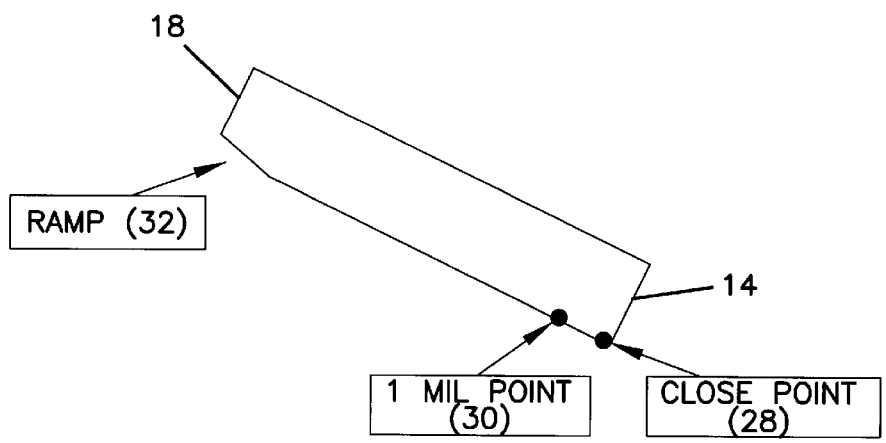
FIG. 4 is a side view of a glide head.
Figure 5A:
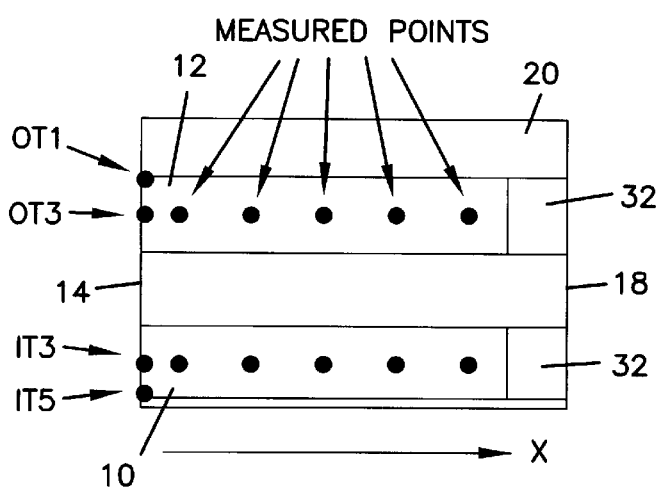
FIG. 5a is an underview of a glide head showing the points of measurement.

FIGS. 2, 4, and 5a display a 50% two-rail slider with a PZT mounted on its extended wing at the trailing edge. In FIG. 2, the outer rail 10 is spaced from an inner rail 12, and there is mounted between them a connector portion 14. The leading edge is indicated by numeral 16, and there is a trailing edge 18. Extending from the inner rail 12 between the leading edge 16 and trailing edge 18 there is a wing section 20, which mounts a PZT block 22. The PZT block 22 also includes an electrode 24, and a PZT signal is obtained from the pedal 26.

The close point is shown in FIG. 4 as position 28, and there is a 1 mil point 30, which is spaced from the close point. The glide head also includes a ramp portion 32, which is located near the trailing edge 18 of the glide head.

As indicated in FIG. 5a, the close point is measured transversely across the leading edge 14 at four different transverse positions. The selected transverse position will depend on the roll of the glide head. The actual measured points are indicated along a longitudinal line substantially in line with position OT3 and another longitudinal line substantially along the line indicated by position IT3.

Figure 3:
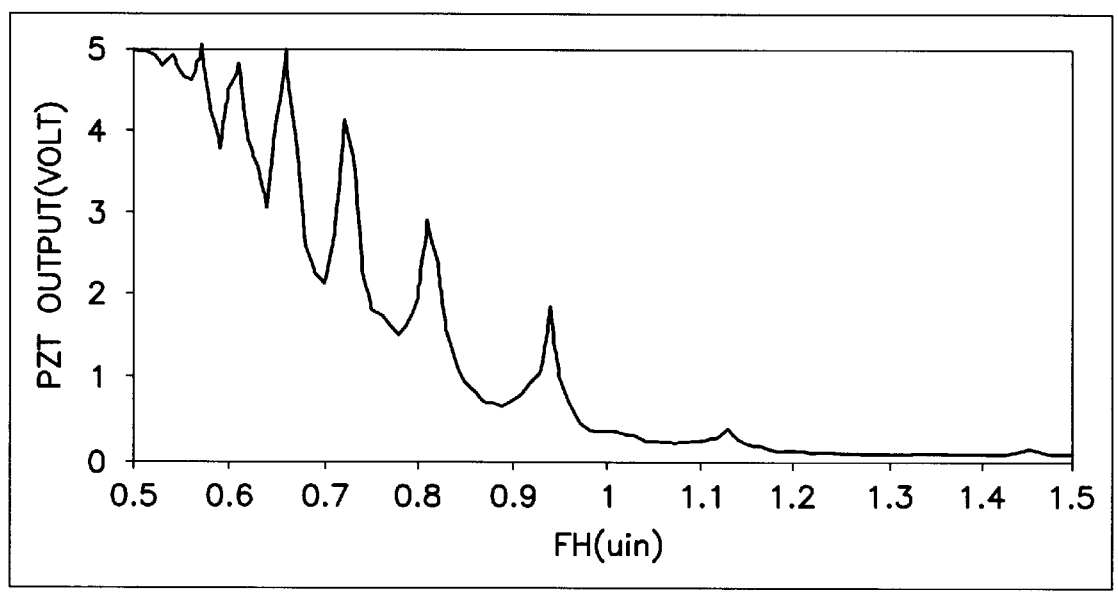
FIG. 3 is a glide avalanche curve of a low zone texture disc. The BH=183A and bump pitch 30 $\mu$m in circumferential and 30 $\mu$m in radial (C×R=30×30).

FIG. 3 illustrates a glide avalanche curve. In FIG. 3, the spiky feature of the curve not only makes it difficult to determine the GABP, but also could fail the disc in the glide test. For example, if the threshold of the glide test were set to 1.5 Volt, the disc would fail $0.95\mu$ in glide test, whereas without resonance, the texture would pass the test.

Figure 5B:
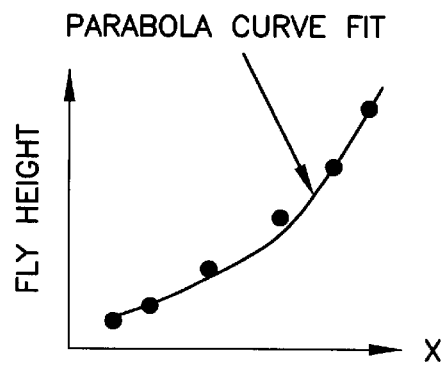
FIG. 5b is a parabola fit extrapolated to determine the close point.
Figure 6:
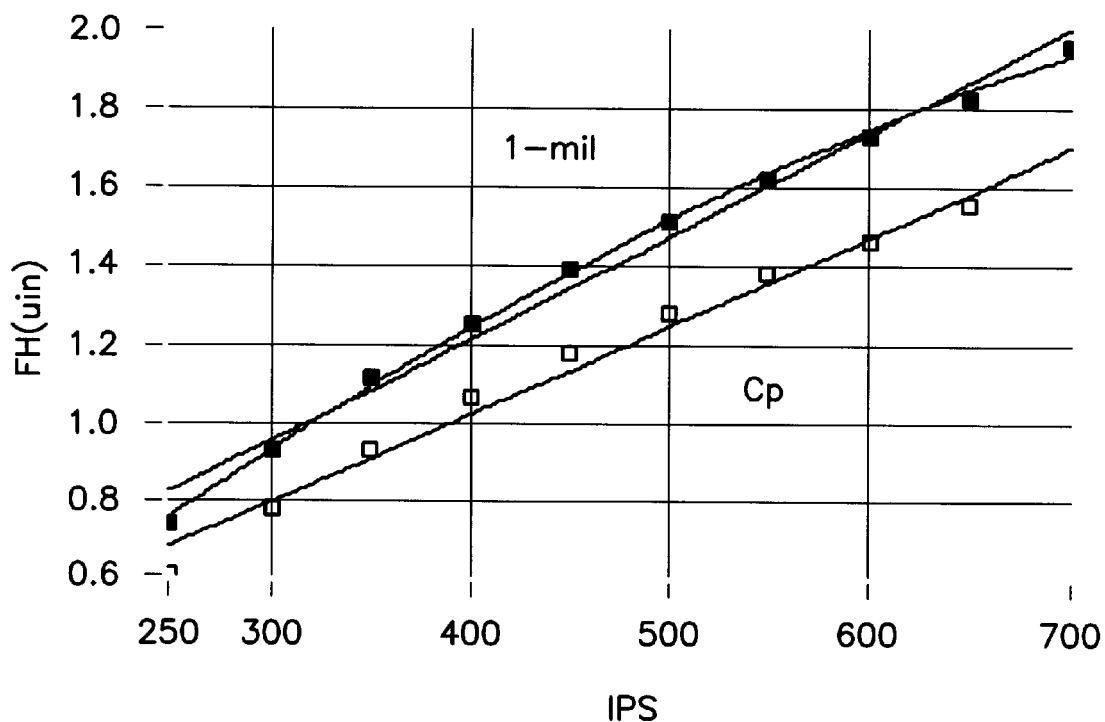
FIG. 6 is a fly height comparison between 1-mil and Cp.

FIG. 5a shows a underview of a PZT glide head. The points that are fly height measured are denoted as measured points as shown in FIG. 5a. One can fit a parabola curve for the measured points and calculate the close point fly-height as shown in FIG. 5b. For example, the fly height of OT1, OT3, IT3, and IT5 can be calculated. The close point will be the lowest fly height of these four points. If the head has a significant roll, either OT1 or IT5 is the Cp. Otherwise, OT3 or IT3 is the Cp. The minimum number of measured points is three. More measured points will provide a more accurate calculation of the fly height of Cp. A typical fly height data for both 1-mil and Cp are shown in FIG. 6.

Many other forms of the invention exist, each differing from others in matter of detail only. For instance, although it is indicated that three points are measured to determined a close point, five or more points can be determined before the extrapolation and curve that is effected. The invention also has application in a transverse direction so that a planar fit can be achieved in addition to a straight line fit.

The invention is to be determined solely by the following claims.

What is claimed is:

1. A method of obtaining a fly height of a selected point of a glide head, the method comprising the steps of:

measuring fly heights of three points wherein the three measured points are located away from the selected point;

fitting a curve through the three measured points; and extrapolating the curve to thereby obtain a fly height at the selected point.

2. A method as claimed in claim 1 wherein the selected point is a close point of the glide head.

3. A method as claimed in claim 2 wherein the close point is determined at predetermined locations transversely across the head.

4. A method as claimed in claim 3 wherein the transverse locations are close points towards the outer transverse extremities of the head.

5. A method as claimed in claim 4 wherein the transverse locations include positions inwardly spaced from the outer transverse extremities of the head.

6. A method as claimed in any one of claims 3, 4, or 5 including selecting at least one of the close points as a chosen close point for the head.

7. A method as claimed in claim 6 wherein the selected close point is one of the extremity close points when the head has a transverse roll beyond a predetermined amount.

8. A method as claimed in claim 7 wherein the selected close point is one of the inwardly spaced close points when the head has a transverse roll less than a predetermined amount.

9. A method of obtaining the fly height of a close point of a glide head comprising:

measuring the fly height of at least three positions moved from the close point;

curve fitting the three close points; and extrapolating the curve to thereby obtain the height at the close point.

10. A method as claimed in claim 9 wherein the close point is determined at predetermined locations transversely across the head.

11. A method as claimed in claim 10 wherein the transverse locations are located toward the outer transfer extremities of the head.

12. A method as claimed in claim 11 wherein the transverse locations include positions inwardly spaced from the outer transverse extremities of the head.

* * * * *